United States Patent
Chung

(10) Patent No.: US 9,530,448 B1
(45) Date of Patent: Dec. 27, 2016

(54) TRAY BRAKING DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Ming-Hung Chung, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/177,000

(22) Filed: Jun. 8, 2016

(30) Foreign Application Priority Data

Mar. 31, 2016 (CN) .......................... 2016 1 0195376

(51) Int. Cl.
- G11B 17/04 (2006.01)
- G11B 17/056 (2006.01)
- G11B 17/053 (2006.01)
- G11B 17/044 (2006.01)
- G11B 17/047 (2006.01)

(52) U.S. Cl.
CPC .......... G11B 17/056 (2013.01); G11B 17/044 (2013.01); G11B 17/053 (2013.01); *G11B 17/047* (2013.01)

(58) Field of Classification Search
CPC ... G11B 17/04; G11B 17/0407; G11B 17/044; G11B 17/047; G11B 17/05; G11B 17/053; G11B 17/056

USPC ........................................................ 720/602
See application file for complete search history.

(56) References Cited

U.S. PATENT DOCUMENTS

| | | | | |
|---|---|---|---|---|
| 5,883,870 A * | 3/1999 | Akiba | .................. | G11B 17/056 720/602 |
| 7,143,423 B2 * | 11/2006 | Arase | .................. | G11B 17/056 720/602 |
| 8,042,124 B2 * | 10/2011 | Liu | ....................... | G11B 17/035 720/610 |
| 8,104,050 B2 * | 1/2012 | Hamaie | ................ | G11B 17/056 369/268 |
| 8,122,463 B2 * | 2/2012 | Yang | ................... | G11B 17/0405 720/613 |
| 8,185,919 B2 * | 5/2012 | Murata | ................ | G11B 17/056 720/602 |
| 8,640,151 B2 * | 1/2014 | Matsumoto | .......... | G11B 17/056 720/611 |

(Continued)

*Primary Examiner* — Brian Miller
(74) *Attorney, Agent, or Firm* — Rabin & Berdo, P.C.

(57) ABSTRACT

The tray braking device includes a tray, a tray motor, a sliding plate and a buffer structure. The tray is used for carrying a disc. The tray motor is used for driving the tray to a finish position from a first position. The sliding plate is disposed on a base. The buffer structure is disposed between the sliding plate and the base. When the tray moves to a second position from the first position, the tray moves at a first speed, and the second position is positioned between the first position and the finish position. When the tray moves towards the finish position from the second position, the tray drives the sliding plate to move, such that the buffer structure leans between the sliding plate and the base and generates deformation, making the tray move at a second speed slower than the first speed.

4 Claims, 8 Drawing Sheets

(56) References Cited

U.S. PATENT DOCUMENTS

| | | | |
|---|---|---|---|
| 2005/0030665 A1* | 2/2005 | Yang | G11B 17/056 360/99.06 |
| 2005/0050560 A1* | 3/2005 | Nishide | G11B 17/056 720/610 |
| 2011/0197210 A1* | 8/2011 | Yamasaki | G11B 17/056 720/604 |

* cited by examiner

TRAY BRAKING DEVICE

This application claims the benefit of People's Republic of China application Ser. No. 201610195376.1, filed Mar. 31, 2016, the disclosure of which is incorporated by reference herein in its entirety.

TECHNICAL FIELD

The disclosure relates in general to a tray braking device, and more particularly to a tray braking device having buffer structure.

BACKGROUND

Along with the booming growth in the multi-media industry, the disc with smaller size, larger capacity and longer duration of data storage has won great popularity among consumers. Due to the popularity of the disc, the disc drive with disc access function is crucial to the multi-media market. Existing tray-type disc drive has a tray and a tray motor. The tray is used for carrying a disc, and the tray motor is used for driving the tray to enter or exit the disc drive, so that the user can conveniently load the disc into the disc drive or unload the disc from the disc drive.

Normally, when the user would like to unload the disc, the control unit of the disc drive provides a default ejection time within which the tray motor drives the tray to move, such that the disc can be unloaded from the disc drive. The setting of the default ejection time is based on whether the tray can stably and accurately exit the disc drive.

However, the way of setting a default ejection time within which the tray is driven to unload the disc from the disc drive does not guarantee that the tray can stably exit the disc drive or that the ejection distance of the tray can be controlled accurately. Therefore, when the user uses the disc drive, the tray may collide with the stopper and tremble heavily if the ejection distance is too long, or may have an insufficient ejection distance.

For example, if the power outputted from the tray motor is too small or the ejection time is too short, the tray cannot move to a default position, from which the user can conveniently unload the disc. Conversely, if the power outputted from the tray motor is too large or the ejection time is too long, the tray may collide with the stopper disposed on the base. Under such circumstance, the use efficiency of the disc drive will decrease dramatically. To the worse, if the tray exits the disc drive at a high speed and the speed cannot be timely reduced, the tray may easily collide with the stopper disposed on the base and tremble severely. Such trembling may cause the disc to come off the tray, and the disc may be damaged.

Also, to avoid huge collision between the tray and the base, existing disc drive activates the limit switch when the tray moves to be near the predetermined position, and further transmits a feedback signal to the tray motor to activate a braking function to avoid the tray exceeding the predetermined position and colliding with the base. However, the use of limit switch will incur more cost and parts to the disc drive, and cannot save production cost.

SUMMARY

The disclosure is directed to a tray braking device, which, through elasticity and deformation of a buffer structure, provides a suitable buffering force to consume extra ejection time and mitigate the collision between the tray and the stopper on the base.

According to one embodiment, a tray braking device is provided. The tray braking device includes a tray, a tray motor, a sliding plate and a buffer structure. The tray is used for carrying a disc. The tray motor is used for driving the tray to a finish position from a first position. The sliding plate is disposed on a base. The buffer structure is disposed between the sliding plate and the base. When the tray moves to a second position from the first position, the tray moves at a first speed, and the second position is positioned between the first position and the finish position. When the tray moves towards the finish position from the second position, the tray drives the sliding plate to move, such that the buffer structure leans between the sliding plate and the base and generates deformation, making the tray move at a second speed slower than the first speed.

The above and other aspects of the invention will become better understood with regard to the following detailed description of the preferred but non-limiting embodiment(s). The following description is made with reference to the accompanying drawings.

Figure 1A:
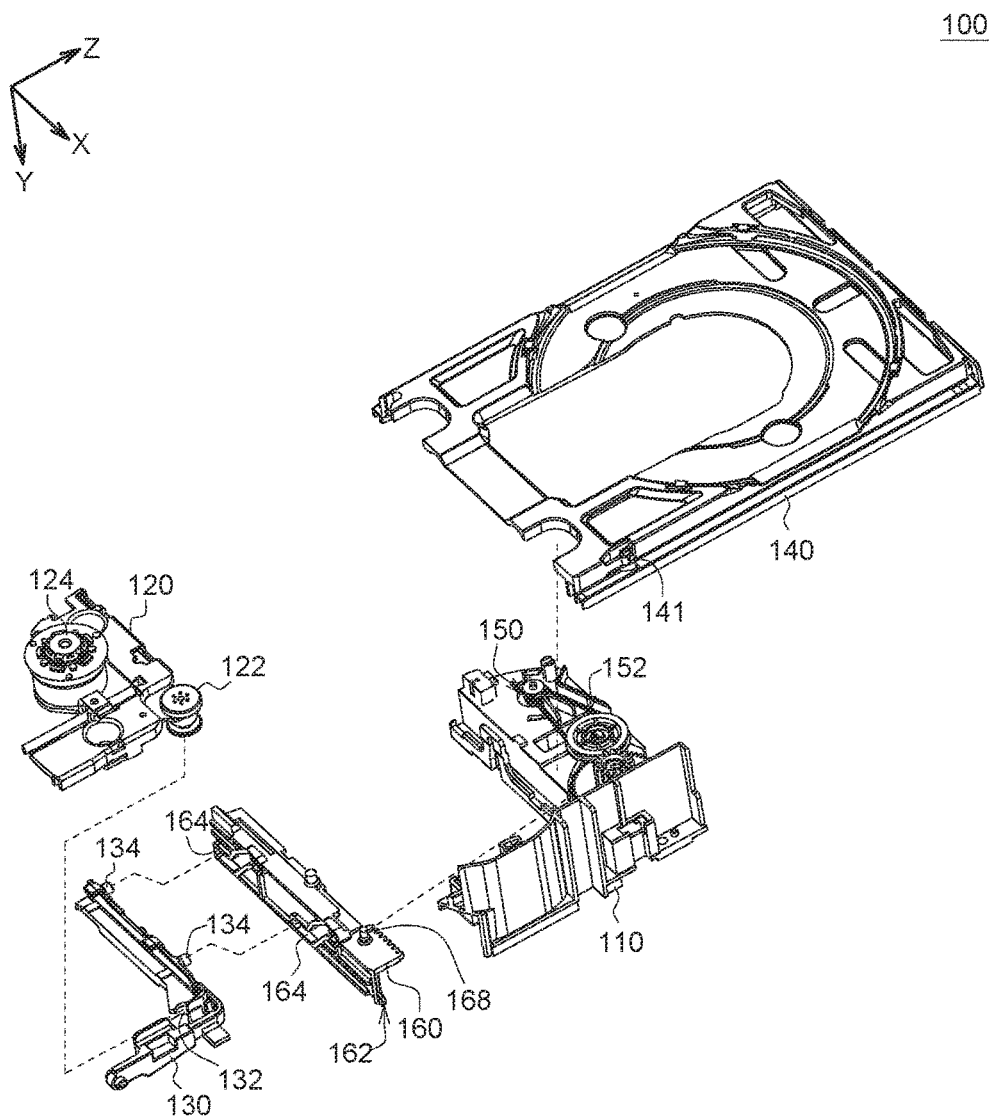
FIG. 1A and FIG. 1B respectively are an explosion diagram and an assembly diagram of a tray braking device according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Principles of the structure and operation of the device of the invention are described below with accompanying drawings.

According to a tray braking device disclosed in an embodiment of the invention, a cantilever or an elastomer is disposed on a lateral side of a sliding plate or a body of the sliding plate and used as a buffer structure during tray ejection. The cantilever and the lateral side of the sliding plate are separated by a gap which provides buffer effect for the deformation of the cantilever. The elastomer, which can be formed of rubber or porous material, can be compressed and deformed to generate a suitable buffering force.

In another embodiment, the said cantilever or elastomer can also be disposed on the sidewall of the base or the sliding rail of the tray and used as a buffer structure during tray ejection.

A number of embodiments are disclosed below for elaborating the invention. However, the embodiments of the invention are for detailed descriptions only, not for limiting the scope of protection of the invention.

Figure 1B:
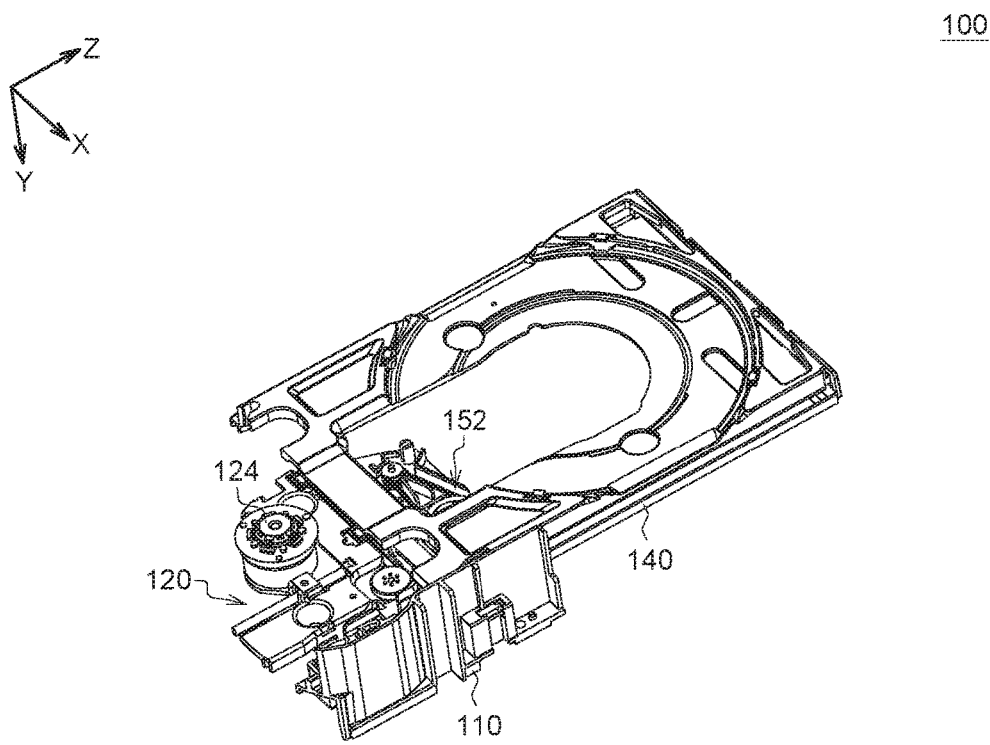

Referring to FIG. 1A and FIG. 1B, an explosion diagram and an assembly diagram of a tray braking device 100 according to an embodiment of the invention respectively are shown. The base 110 of the disc drive has a traverse assembly 120, a carrier 130, a tray 140, a tray motor 150 and a sliding plate 160 disposed thereon. One side of the traverse assembly 120 has two washers 122 (only one is illustrated) respectively positioned at two positioning holes 132 (only one is illustrated) on the carrier 130 using a positioning member. Besides, the base 110 of the disc drive further has two positioning holes (not illustrated in the diagram) used for positioning purpose. The other side of the traverse assembly 120 has two washers (not illustrated in the diagram) respectively positioned at two positioning holes (not illustrated in the diagram) on the base 110 using a positioning member.

Furthermore, the carrier 130 has two bumps 134 inserted into two corresponding guide grooves 164 on the sliding plate 160. The two guide grooves 164, such as Z-shaped grooves or ㄴ-shaped grooves, are used for guiding the bumps 134 to move up and down along the guide grooves 164. The sliding plate 160 is disposed on the base 110 and can horizontally slide with respect to the base 110. When the sliding plate 160 moves along a first direction (the X-axis direction), the sliding plate 160 can drive the carrier 130 and the traverse assembly 120 to move with respect to the base 110 along a second direction (the Y-axis direction) perpendicular to the first direction and work with the tray 140 to load in or eject a disc.

The tray 140 is used for carrying a disc. The tray motor 150 is used for driving the tray 140 to enter or exit the disc drive, such that the user can conveniently load the disc into the disc drive or unload the disc from the disc drive. Generally speaking, when the tray 140 exits the disc drive, the tray motor 150 drives the belt and gear set 152 to eject the tray 140 along a Z-axis direction, and the tray motor 150 drives the sliding plate 160 to move along the X-axis direction. Through the cooperation between the bumps 134 and the guide grooves 164 on the sliding plate 160, the carrier 130 is guided by the guide grooves 164 to move towards the bottom of the base 110 along the Y-axis direction, such that one side of the traverse assembly 120 also moves downwards and makes the turntable 124 on the traverse assembly 120 come off the disc. Meanwhile, the disc still stays on the tray 140. Then, the tray 140 continues to move to a finish position along the Z-axis direction.

Figure 2A:
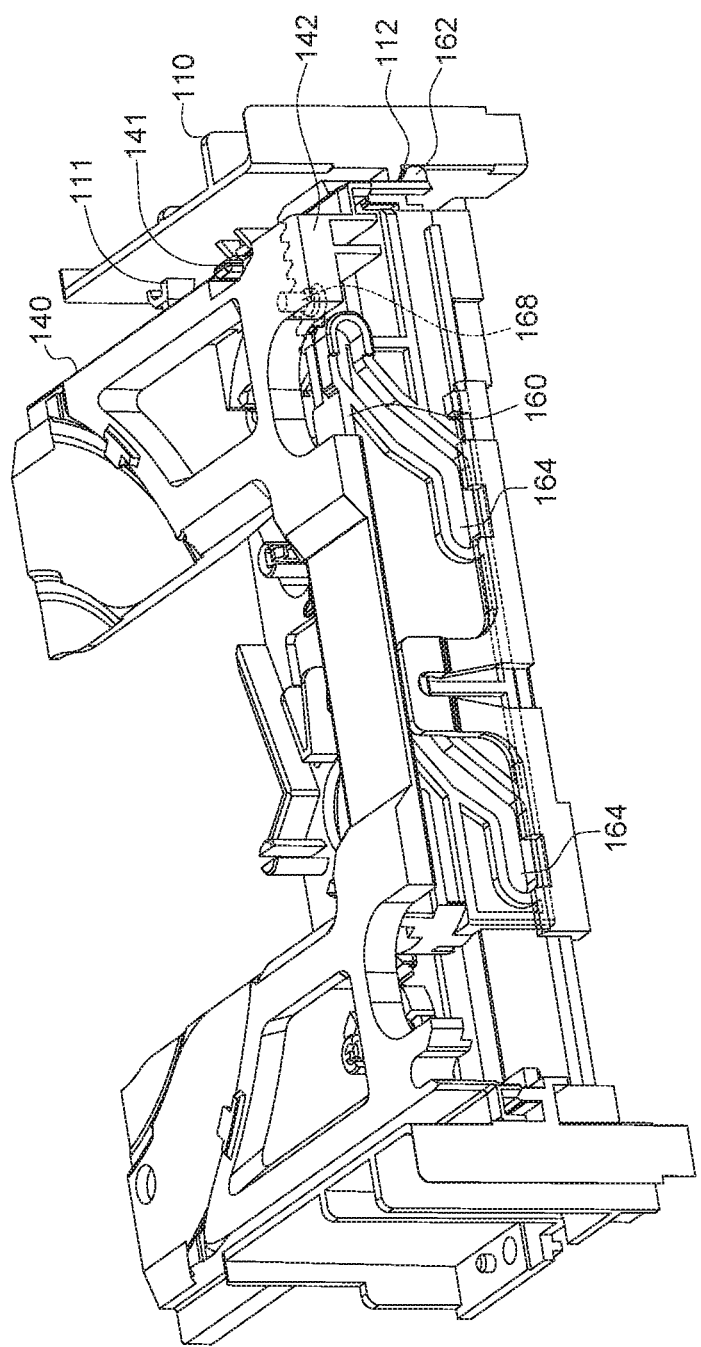
FIGS. 2A~2C are schematic diagrams of an operation of a tray braking device according to an embodiment of the invention.
Figure 2B:
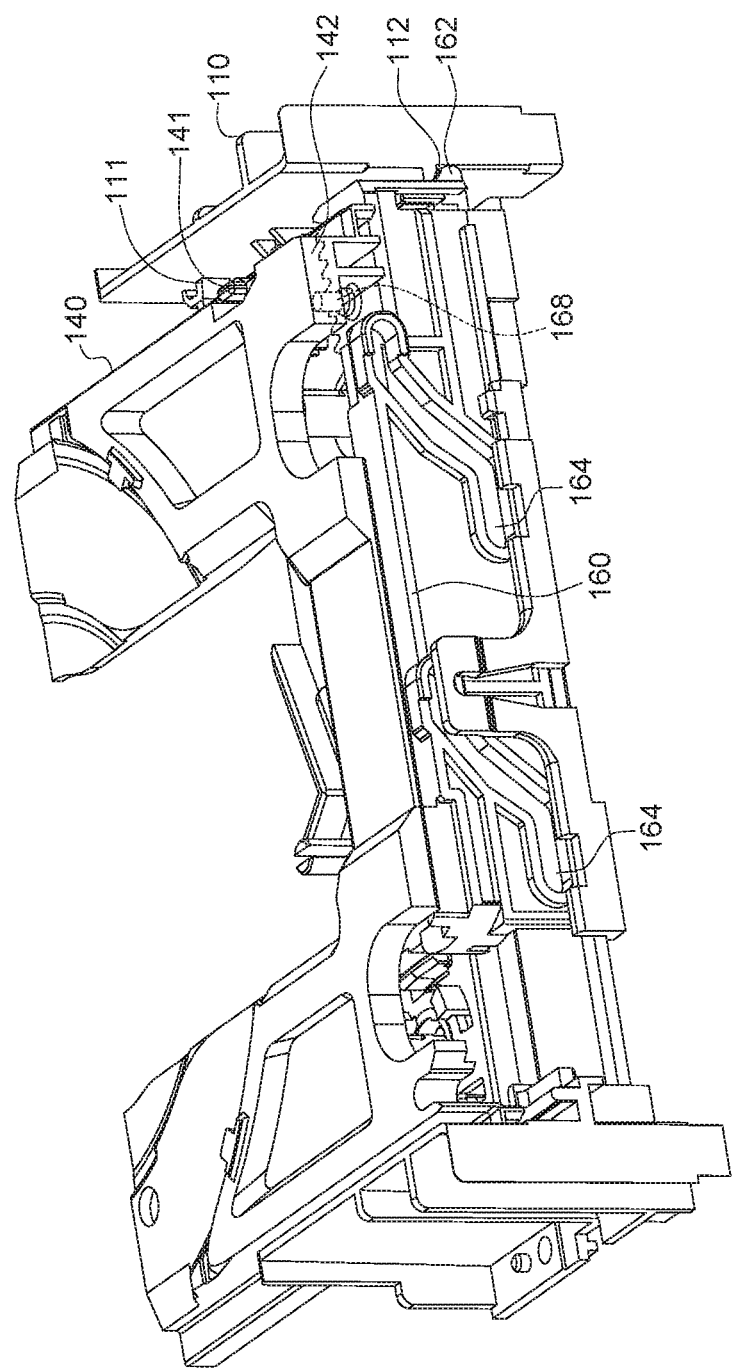
Figure 2C:
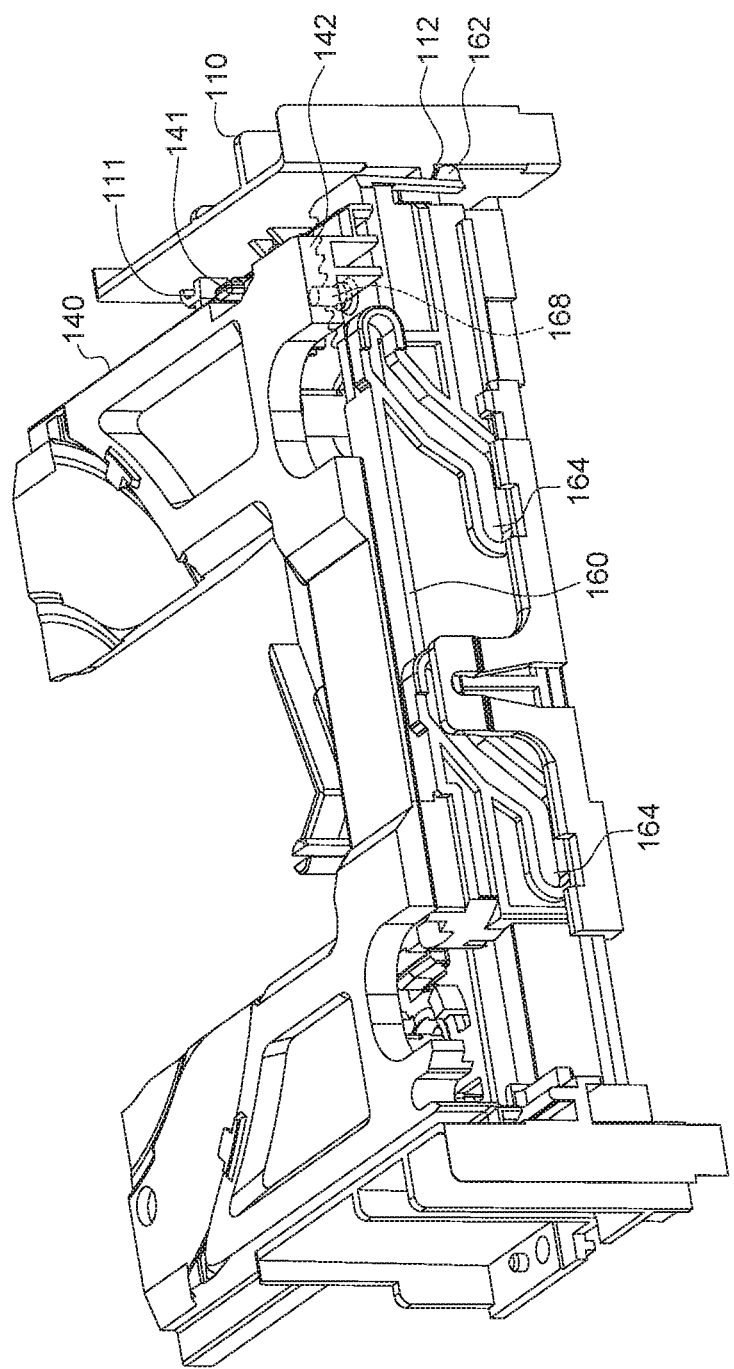

Referring to FIGS. 2A~2C, schematic diagrams of the operation of a tray braking device 100 according to an embodiment of the invention are shown. As indicated in FIG. 2A, a lateral side of the sliding plate 160 has a buffer structure 162, such as a cantilever or an elastomer. When the tray 140 is at a first position (the position as indicated in FIG. 2A), the buffer structure 162 does not contact the base 110. When the tray 140 is driven by the tray motor 150, the tray 140 moves to a second position (the position as indicated in FIG. 2B) from the first position at a first speed. When the tray 140 is at the second position, the buffer structure 162 leans on a sidewall 112 of the base 110. Meanwhile, the buffer structure 162 has not yet generated deformation, and the tray 140 is still driven by the tray motor 150 to move continuously. As indicated in FIG. 2C, when the tray 140 continues to move to the finish position (the position as indicated in FIG. 2C) from the second position, the sliding plate 160 is driven by the tray 140 to move towards the sidewall 112 of the base 110 and the buffer structure 162 is compressed by the sliding plate 160 and the sidewall 112 to generate deformation. When the tray 140 is affected by a braking force generated from the deformation of the buffer structure 162, the tray 140 no more moves at the first speed, but will move at a second speed slower than the first speed, and eventually stop at the finish position.

That is, during the period when the tray 140 moves to the second position from the first position, the tray 140 moves at a normal ejection speed. When the tray 140 nearly reaches the finish position, the buffer structure 162 disposed on the sliding plate 160 contacts the base 110 and generates a deformation, which applies a braking force on the tray 140 to reduce the speed of the tray 140. Thus, the tray 140 still maintains stability during the ejection operation, hence avoiding the problems of elements being damaged or the disc coming off the tray 140 which would otherwise arise if the tray 140 exits the disc drive at a high speed and collides with the base 110.

As indicated in FIG. 1A and FIG. 2A, the tray 140 has a first stopping portion 141, and the base 110 has a second stopping portion 111 (stopper). The first stopping portion 141 and the second stopping portion 111 are positioned on a sliding path of the tray 140. Before the first stopping portion 141 collides with the second stopping portion 111, due to the disposition of the buffer structure 162, which blocks the tray 140 and reduces its ejection speed at the final stage of ejection, the first stopping portion 141 will not heavily collide with the second stopping portion 111. If the first stopping portion 141 heavily collides with the second stopping portion 111, the tray 140 will wobble dramatically, and the disc may come off the tray 140. The tray braking device 100 disclosed in an embodiment of the invention can resolve and avoid the above problems.

In an embodiment, the disc drive further has a timing unit used for setting an ejection time of the tray 140. Once the ejection time finishes, the tray motor 150 will immediately stop outputting any power to move the tray 140, and the inertial motion of the tray 140 will bring the tray 140 to stably stop at a predetermined position. The ejection time of the tray 140 is the time required for the tray motor 150 to drive the tray 140 to move to the finish position from the first position at the first speed. Due to the consideration of stability during the ejection of the tray 140, when the tray 140 nearly reaches the finish position, the buffer structure 162 generates a braking function with buffering effect to reduce the speed of the tray 140 and at the same time consume the disc ejection time, such that the tray 140 can stably stop at the finish position.

Figure 3A:
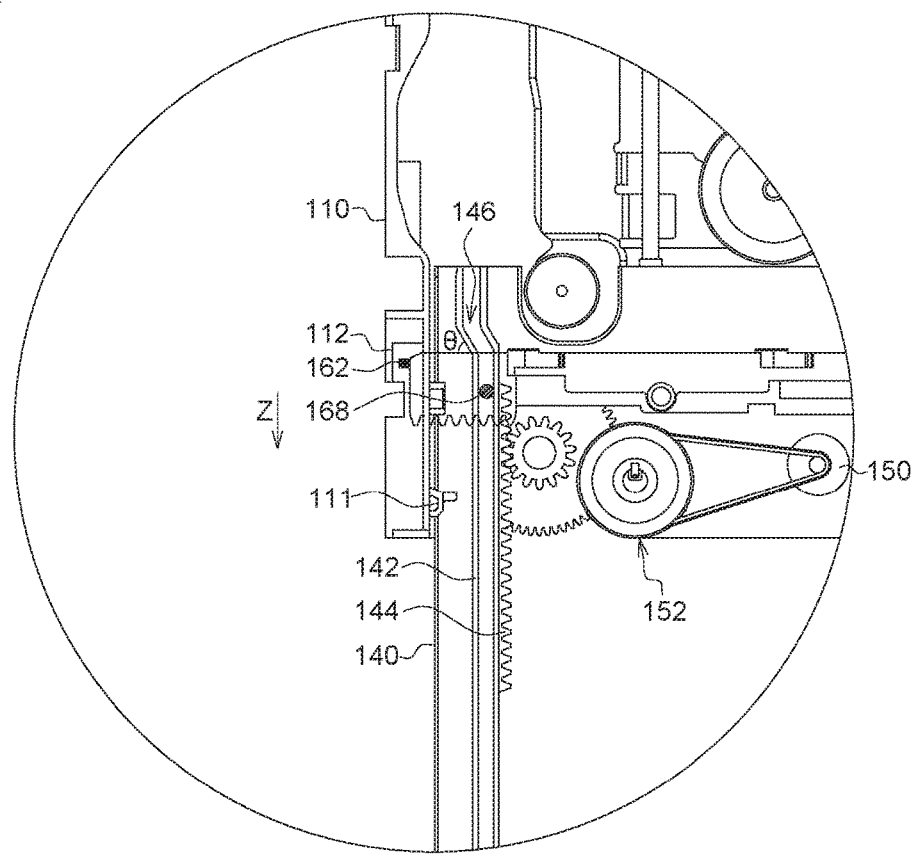
FIGS. 3A~3C are schematic diagrams of an operation of a tray braking device according to an embodiment of the invention.
Figure 3B:
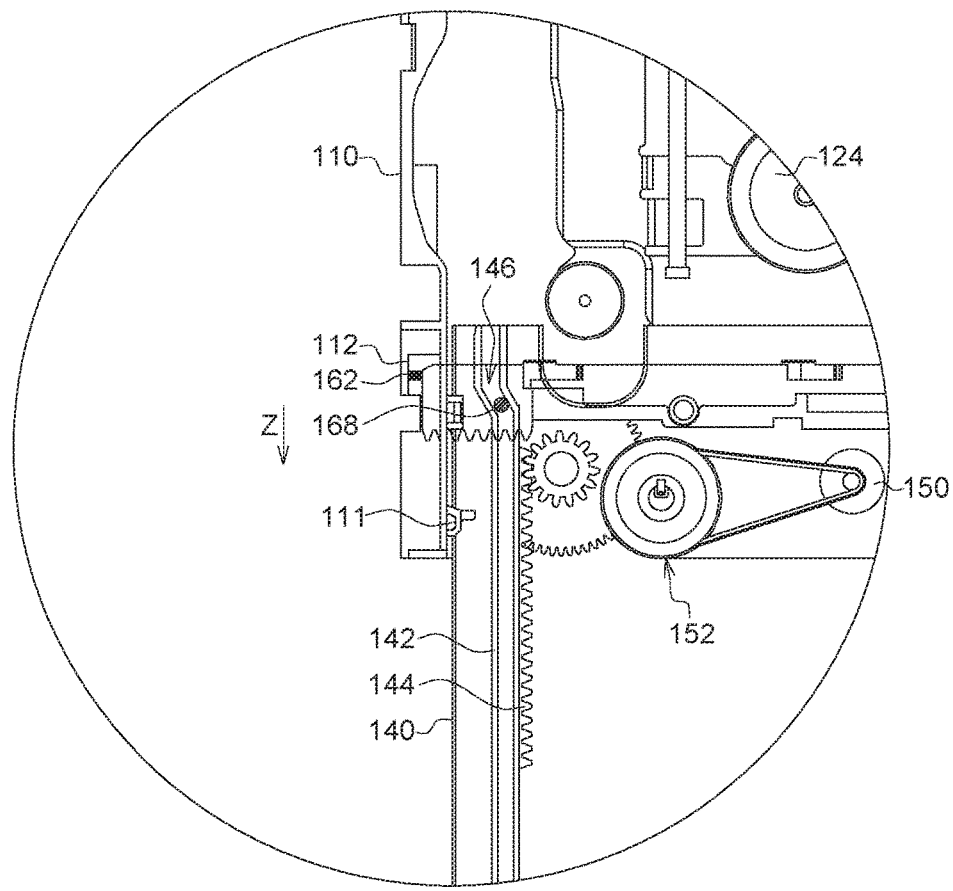
Figure 3C:
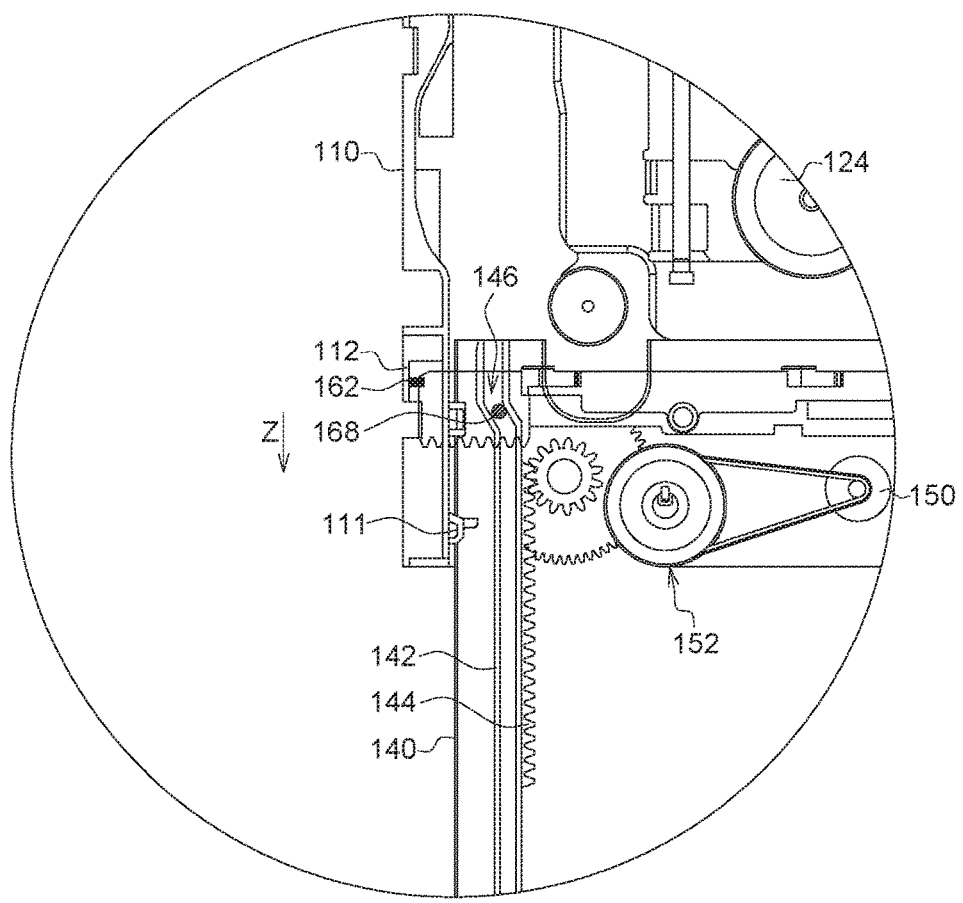

Referring to FIGS. 3A~3C, schematic diagrams of the operation of a tray braking device 100 according to an embodiment of the invention are shown. As indicated in FIG. 3A, the sliding plate 160 has a positioning column 168 positioned in a sliding rail 142 of the tray 140. The tray 140 has tooth rack 144 engaged with the belt and gear set 152, such that the tray motor 150 can drive the tray 140 to move. During the period when the tray 140 moves to the second position from the first position, the positioning column 168 continues to proceed along an extending direction of the sliding rail 142. As indicated in FIG. 3B, the sliding rail 142 has a bevel angle θ, such that the sliding rail 142 tilts towards the sidewall 112 of the base 110 to form a bevel edge 146. When the tray 140 is at the second position, the lateral side of the sliding plate 160 leans on the sidewall 112 of the base 110 through the buffer structure 162. The position of the positioning column 168 corresponds to the bevel edge 146 on the sliding rail 142. As indicated in FIG. 3C, when the tray 140 continues to move to the finish position from the second position, the positioning column 168 will be pushed to move towards the sidewall 112 of the base 110 by the bevel edge 146 of the sliding rail 142. Thus, the sliding plate 160 moves horizontally, the buffer structure 162 is compressed by the sliding plate 160 and the sidewall 112 to generate deformation which accordingly applies a braking function with buffering effect on the tray 140.

The existing disc drive transmits a feedback signal of the limit switch to the tray motor 150 to activate a braking function to avoid the tray 140 exceeding the predetermined position and colliding with the stopper of the base 110. In the present embodiment, the buffer structure 162 reduces the speed of the tray 140, such that the tray 140 brakes when nearly reaching the finish position. Thus, the disc drive of the invention can dispense with the use of existing limit switch, and the cost and parts of the disc drive can be reduced accordingly.

In another embodiment, the buffer structure 162 can be disposed on the sidewall 112 of the base 110 or the sliding rail 142 of the tray 140. When the sliding plate 160 is driven by the tray 140 to move towards the sidewall 112 of the base 110, the sliding plate 160 leans on the buffer structure 162 disposed on the sidewall 112, such that the buffer structure 162 is deformed to generate a braking effect. Furthermore, the tray 140, affected by the braking effect generated from the deformation of the buffer structure 162, will no more move at the first speed but will move at a second speed slower than the first speed, and eventually stop at the finish position.

The tray braking device disclosed in above embodiments of the invention avoids the tray exiting the disc drive at a high speed or colliding with the stopper disposed on the base, such that the disc will not come off the tray. Additionally, the disc drive of the invention reduces the speed of the tray through the deformation of the buffer structure, such that the tray brakes when nearly reaching the finish position. Thus, the disc drive of the invention can dispense with the limit switch, and the cost and parts of the disc drive can be reduced accordingly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A tray braking device comprising:
   a tray used for carrying a disc;
   a tray motor used for driving the tray to a finish position from a first position;
   a sliding plate disposed on a base; and
   a buffer structure disposed between the sliding plate and the base, wherein when the tray moves to a second position from the first position, the tray moves at a first speed, and the second position is positioned between the first position and the finish position,
   wherein the sliding plate has a positioning column, the tray has a sliding rail corresponding to the positioning column, and during a period when the tray moves to the second position from the first position, the positioning column proceeds forwardly along an extending direction of the sliding rail,
   when the tray moves towards the finish position from the second position, the tray drives the sliding plate to move, such that the buffer structure leans between the sliding plate and the base to generate deformation, which makes the tray move at a second speed slower than the first speed.

2. The tray braking device according to claim 1, wherein the buffer structure is a cantilever or an elastomer disposed on a lateral side of the sliding plate.

3. The tray braking device according to claim 1, wherein the sliding rail has a bevel angle, such that the sliding rail tilts towards a sidewall of the base to form a bevel edge, and when the tray is positioned at the second position, the buffer structure leans between the sliding plate and the base, and the positioning column is correspondingly positioned on the bevel edge.

4. The tray braking device according to claim 3, wherein when the tray moves towards the finish position from the second position, the positioning column is pushed by the bevel edge of the sliding rail to make the buffer structure generate deformation.

* * * * *